US010796590B2

(12) United States Patent
Nolan et al.

(10) Patent No.: US 10,796,590 B2
(45) Date of Patent: Oct. 6, 2020

(54) COOKING ENGAGEMENT SYSTEM

(71) Applicant: Haier US Appliance Solutions, Inc., Wilmington, DE (US)

(72) Inventors: Kevin Farrelly Nolan, Louisville, KY (US); Lawrence Michael Portaro, Louisville, KY (US); Tomas Garces, Louisville, KY (US); Samuel Vincent DuPlessis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 293 days.

(21) Appl. No.: 15/783,819

(22) Filed: Oct. 13, 2017

(65) Prior Publication Data
US 2019/0114935 A1 Apr. 18, 2019

(51) Int. Cl.
*G09B 5/02* (2006.01)
*F24C 15/20* (2006.01)
*H04L 29/08* (2006.01)
*F24C 15/10* (2006.01)
*G09B 19/00* (2006.01)
*F24C 7/08* (2006.01)
*G06Q 50/00* (2012.01)
*F21V 23/04* (2006.01)

(52) U.S. Cl.
CPC .............. *G09B 5/02* (2013.01); *F24C 15/106* (2013.01); *F24C 15/2021* (2013.01); *F24C 15/2042* (2013.01); *F24C 15/2064* (2013.01); *G09B 19/0092* (2013.01); *H04L 67/10* (2013.01); *F21V 23/0464* (2013.01); *F24C 7/083* (2013.01); *G06Q 50/01* (2013.01); *H04L 67/12* (2013.01)

(58) Field of Classification Search
CPC . G06F 17/30345; G09B 19/0092; G09B 5/02; F24C 15/106; F24C 15/2021; F24C 15/2042; F24C 15/2064; F24C 7/083; F24C 15/20; H04L 67/10; H04L 67/12; F21V 23/0464; G06Q 50/01
USPC ........................................................ 434/127
See application file for complete search history.

(56) References Cited

U.S. PATENT DOCUMENTS 6,524,539 B1 * 2/2003 Katschnig ................. A61L 2/12
422/186.07
6,621,058 B1 * 9/2003 Kim ..................... F24C 15/2028
126/21 A
(Continued)

FOREIGN PATENT DOCUMENTS

CN 204165094 U 2/2015

*Primary Examiner* — Malina D. Blaise
(74) *Attorney, Agent, or Firm* — Dority & Manning, P.A.

(57) ABSTRACT

A cooking engagement system for a cooktop appliance is provided herein. The cooking engagement system may include a camera assembly, an image monitor, a lighting assembly, and a controller. The camera assembly may be mounted above the cooktop appliance along a vertical direction and directed at a cooktop surface. The image monitor may be mounted above the cooktop appliance and directed away from the cooktop surface. The lighting assembly may be mounted to the casing above the cooktop appliance. The lighting assembly may include a light source directed at the cooktop source to emit a light thereto. The controller may be in operable communication with the camera assembly and the image monitor to initiate an interactive cooking operation.

14 Claims, 9 Drawing Sheets

(56) References Cited

U.S. PATENT DOCUMENTS

| | | | | |
|---|---|---|---|---|
| 6,992,273 B2* | 1/2006 | Yim | ............ | F24C 15/2028 |
| | | | | 126/21 A |
| 7,699,051 B2* | 4/2010 | Gagas | ............ | F24C 15/2028 |
| | | | | 126/299 D |
| 7,825,358 B2* | 11/2010 | Kim | ............ | H05B 6/6435 |
| | | | | 219/757 |
| 9,219,876 B1 | 12/2015 | Umana | | |
| 9,412,048 B2* | 8/2016 | Guan | ............ | G06K 9/00624 |
| 9,686,825 B2* | 6/2017 | Underwood | ............ | F24C 15/025 |
| 2003/0140638 A1* | 7/2003 | Arshansky | ............ | A47F 3/0482 |
| | | | | 62/155 |
| 2006/0278216 A1* | 12/2006 | Gagas | ............ | F24C 15/2028 |
| | | | | 126/299 D |
| 2007/0089725 A1 | 4/2007 | Patarchi | | |
| 2010/0231506 A1* | 9/2010 | Pryor | ............ | G01F 23/292 |
| | | | | 345/156 |
| 2011/0209626 A1* | 9/2011 | Underwood | ............ | F24C 15/025 |
| | | | | 99/357 |
| 2013/0305762 A1* | 11/2013 | Willis | ............ | A47F 3/0447 |
| | | | | 62/256 |
| 2015/0290795 A1* | 10/2015 | Oleynik | ............ | G05B 19/42 |
| | | | | 700/257 |
| 2016/0059412 A1* | 3/2016 | Oleynik | ............ | B25J 9/163 |
| | | | | 700/257 |
| 2016/0212801 A1* | 7/2016 | Nishijima | ............ | H05B 6/642 |
| 2016/0235218 A1* | 8/2016 | Nuttall | ............ | A47F 3/001 |
| 2016/0259308 A1* | 9/2016 | Fadell | ............ | G05B 15/02 |
| 2019/0114935 A1* | 4/2019 | Nolan | ............ | F24C 15/106 |
| 2019/0238358 A1* | 8/2019 | Hurewitz | ............ | H04W 4/70 |

* cited by examiner

COOKING ENGAGEMENT SYSTEM

FIELD OF THE INVENTION

The present subject matter relates generally to systems for aiding cooking operations, and more particularly to systems for enhancing cooking engagement and convenience with a cooktop appliance.

BACKGROUND OF THE INVENTION

Cooktop or range appliances generally include heating elements for heating cooking utensils, such as pots, pans and griddles. A variety of configurations can be used for the heating elements located on the cooking surface of the cooktop. The number of heating elements or positions available for heating on the range appliance can include, for example, four, six, or more depending upon the intended application and preferences of the buyer. These heating elements can vary in size, location, and capability across the appliance.

In some cases, it may be useful for a user to interact with other appliances, individuals, or both while using a cooktop appliance. As an example, a user may desire guidance with respect to certain cooking operations or recipes. As another example, a user may wish to share various aspects or steps of a cooking operation with individuals at another location (e.g., city, state, country, etc.).

Unfortunately, existing systems can provide an unsatisfactory user experience and can inhibit a user's desired interactions. Recipe books are often cumbersome and difficult to use while cooking. Pages may rip, stain, burn, or become otherwise damaged during use. Moreover, printed materials do not allow for immediate real-time guidance or information. Electronic devices that are connected to the Internet, such as a computer, tablet or smartphone, may allow for immediate interaction with remote information servers or individuals. However, such devices are generally not suitable for use in tandem with a cooktop appliance. A user may be forced to repeatedly move away from the cooktop appliance in order to view the device or provide any input instructions. Moreover, the extreme environment near a cooktop appliance may risk damaging the device. A display or a camera of the device may be rendered unusable. In particular, food or steam may obscure the display or the camera's lens. Lighting suitably adapted for a device's display or camera may be a further issue since the light available near a cooktop appliance can often vary and may be blocked by, for example, a range hood. The diversity of the possible configurations for the cooktop surface can created further challenges to a user's desired interaction with other appliances or individuals.

As a result, improved systems are needed for facilitating user engagement and interaction during use of a cooktop appliance. In particular, it may be advantageous to provide a user engagement system to permit sharing or accessing images and information from a cooktop appliance. In some cases, it may be advantageous to further provide a user engagement system to control or direct certain functions of the cooktop appliance, another appliance, or both.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking engagement system for a cooktop appliance is provided. The cooking engagement system may include a first camera assembly, a second camera assembly, an image monitor, and a controller. The first camera assembly may be positioned above a cooktop surface along a vertical direction. The first camera assembly may be directed at the cooktop surface. The second camera assembly may be positioned above the cooktop surface along the vertical direction. The second camera assembly may be directed away from the cooktop surface. The image monitor may be positioned above the cooktop surface along the vertical direction. The image monitor may be directed away from the cooktop surface. The controller may be in operable communication with the first camera assembly, the second camera assembly, and the image monitor. The controller may be configured to initiate an interactive cooking operation. The interactive cooking operation may include receiving a captured image signal from the first camera assembly or the second camera assembly, and transmitting the captured image signal to a remote server in response to receiving the captured image signal.

In another exemplary aspect of the present disclosure, a cooking engagement system for a cooktop appliance is provided. The cooking engagement system may include a ventilation assembly, a camera assembly, an image monitor, a lighting assembly, and a controller. The ventilation assembly may include a casing and an air handler in fluid communication with the casing to motivate an airflow therethrough. The casing may be spaced apart from a cooktop surface by an open region defined along a vertical direction. The camera assembly may be mounted to the casing above the cooktop appliance. The camera assembly may be directed at the cooktop surface through the open region. The image monitor may be mounted to the casing above the cooktop appliance. The image monitor may be directed away from the cooktop surface. The lighting assembly may be mounted to the casing above the cooktop appliance. The lighting assembly may include a light source directed at the cooktop source to emit a light through the open region. The controller may be in operable communication with the camera assembly and the image monitor. The controller may be configured to initiate an interactive cooking operation. The interactive cooking operation may include receiving a captured image signal from the camera assembly, transmitting the captured image signal to a remote server in response to receiving the captured image signal, receiving a visibility signal, and directing activation of the light assembly or the air handler based on the received visibility signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
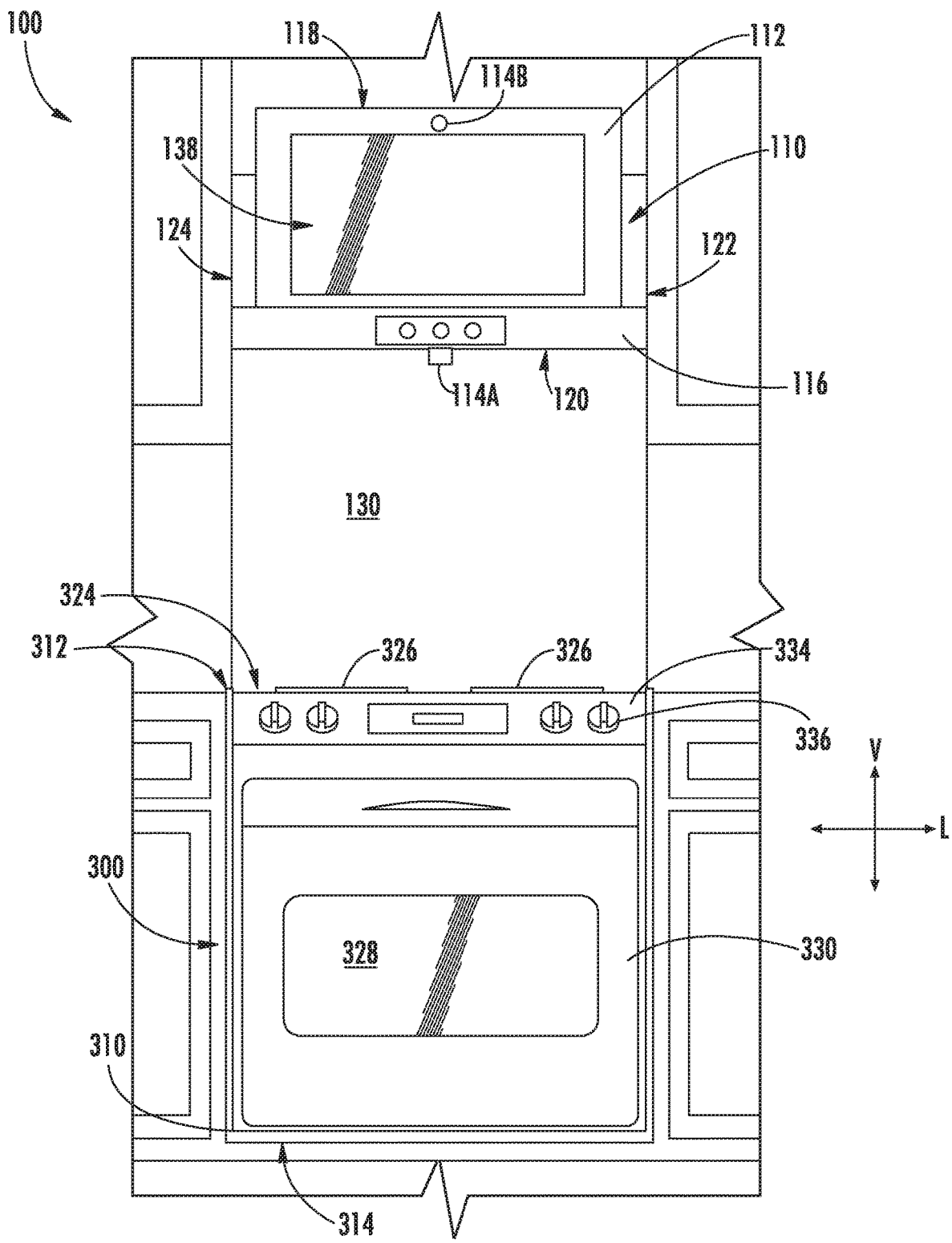
FIG. 1 provides a front perspective view of a system according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present disclosure. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
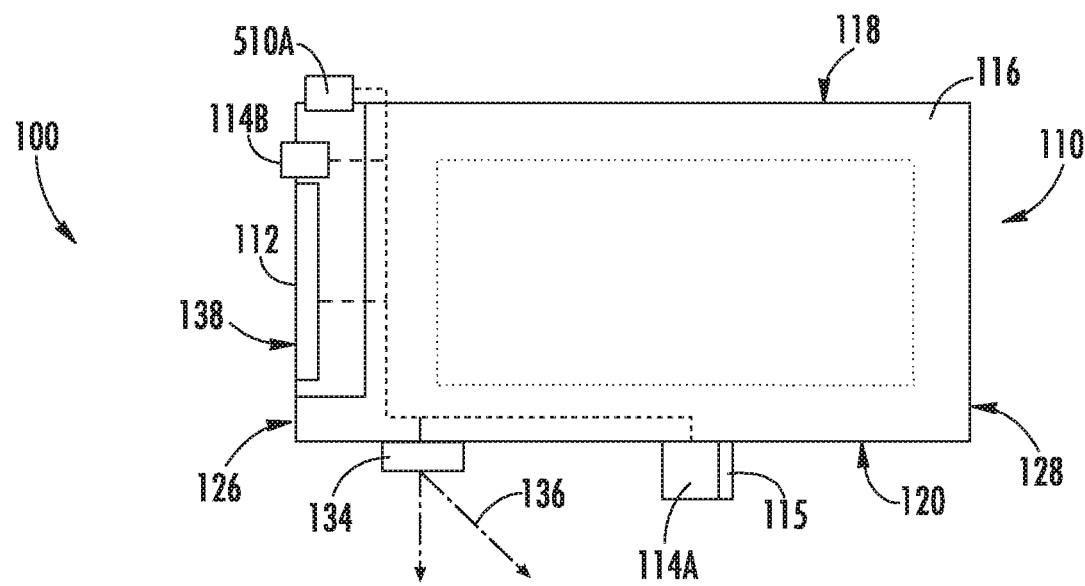
FIG. 2 provides a side schematic view of the exemplary system of FIG. 1.
Figure 2:
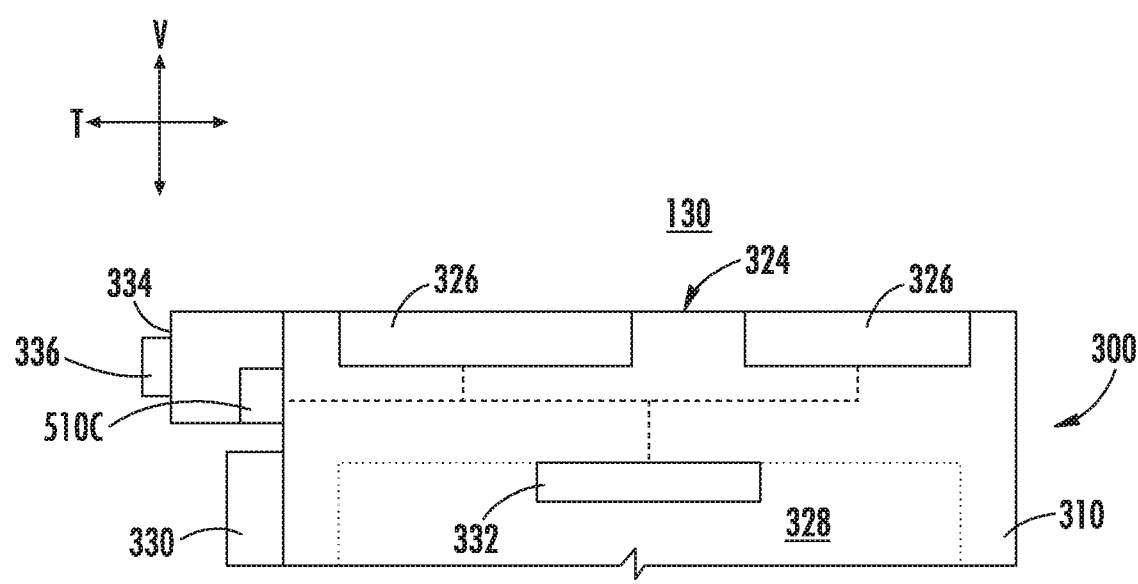
Figure 3:
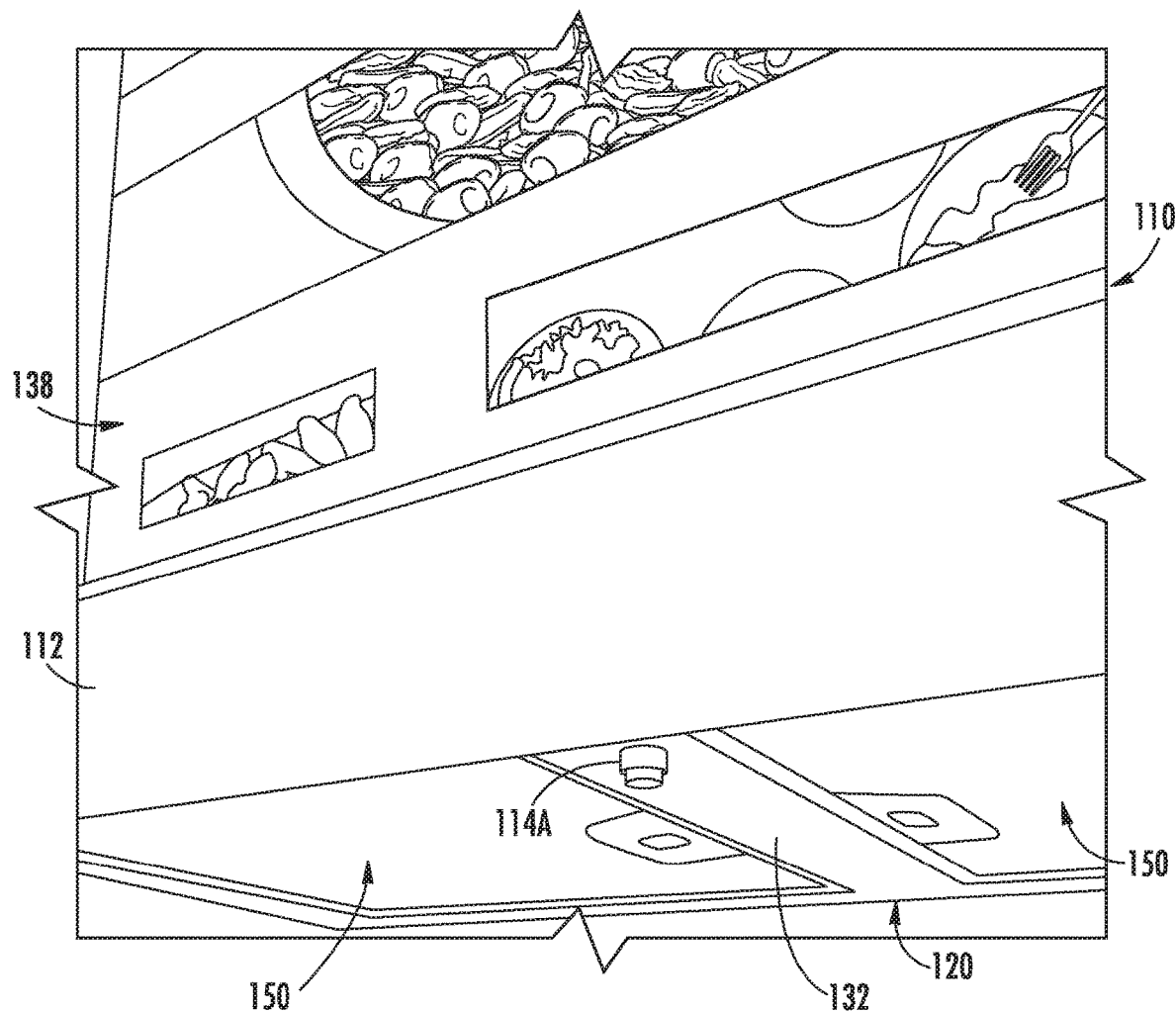
FIG. 3 provides a bottom perspective view of a portion of the exemplary system of FIG. 1.

Turning to the figures, FIGS. 1 through 3 provide various views of a system 100 according to exemplary embodiments of the present disclosure. System 100 generally includes an interactive assembly 110 having a controller 510A in operable communication with an image monitor 112 and one or more camera assemblies (e.g., camera assembly 114A and camera assembly 114B) that are generally positioned above a cooktop appliance 300.

As shown cooktop appliance 300 defines a vertical direction V, a lateral direction L, and a transverse direction T, for example, at a cabinet 310. The vertical, lateral, and transverse directions are mutually perpendicular and form an orthogonal direction system. As shown, cooktop appliance 300 extends along the vertical direction V between a top portion 312 and a bottom portion 314; along the lateral direction L between a left side portion and a right side portion; and along the traverse direction T between a front portion and a rear portion.

Cooktop appliance 300 can include a chassis or cabinet 310 and a cooktop surface 324 having one or more heating elements 326 for use in, for example, heating or cooking operations. In one example embodiment, cooktop surface 324 is constructed with ceramic glass. In other embodiments, however, cooktop surface 324 may include another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In turn, heating element 326 may include a gas burner element, resistive heat element, radiant heat element, induction element, or another suitable heating element.

In some embodiments, cooktop appliance 300 includes an insulated cabinet 310 that defines a cooking chamber 328 selectively covered by a door 330. One or more heating elements 332 (e.g., top broiling elements or bottom baking elements) may be enclosed within cabinet 310 to heat cooking chamber 328. Heating elements 332 within cooking chamber 328 may be provided as any suitable element for cooking the contents of cooking chamber 328, such as an electric resistive heating element, a gas burner, microwave element, halogen element, etc. Thus, cooktop appliance 300 may be referred to as an oven range appliance. As will be understood by those skilled in the art, cooktop appliance 300 is provided by way of example only, and the present subject matter may be used in any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 334 may be provided on cooktop appliance 300. Although shown at front portion of cooktop appliance 300, another suitable location or structure (e.g., a backsplash) for supporting user interface panel 334 may be provided in alternative embodiments. In some embodiments, user interface panel 334 includes input components or controls 336, such as one or more of a variety of electrical, mechanical, or electro-mechanical input devices. Controls 336 may include, for example, rotary dials, knobs, push buttons, and touch pads. A controller 510C is in communication with user interface panel 334 and controls 336 through which a user may select various operational features and modes and monitor progress of cooktop appliance 300. In additional or alternative embodiments, user interface panel 334 includes a display component, such as a digital or analog display in communication with a controller 510C and configured to provide operational feedback to a user. In certain embodiments, user interface panel 334 represents a general purpose I/O ("GPIO") device or functional block.

As shown, controller 510C is communicatively coupled (i.e., in operative communication) with user interface panel 334 and its controls 336. Controller 510C may also be communicatively coupled with various operational components of cooktop appliance 300 as well, such as heating elements (e.g., 326, 332), sensors, etc. Input/output ("I/O") signals may be routed between controller 510C and the various operational components of cooktop appliance 300. Thus, controller 510C can selectively activate and operate these various components. Various components of cooktop appliance 300 are communicatively coupled with controller 510C via one or more communication lines such as, for example, conductive signal lines, shared communication busses, or wireless communications bands.

Figure 5:
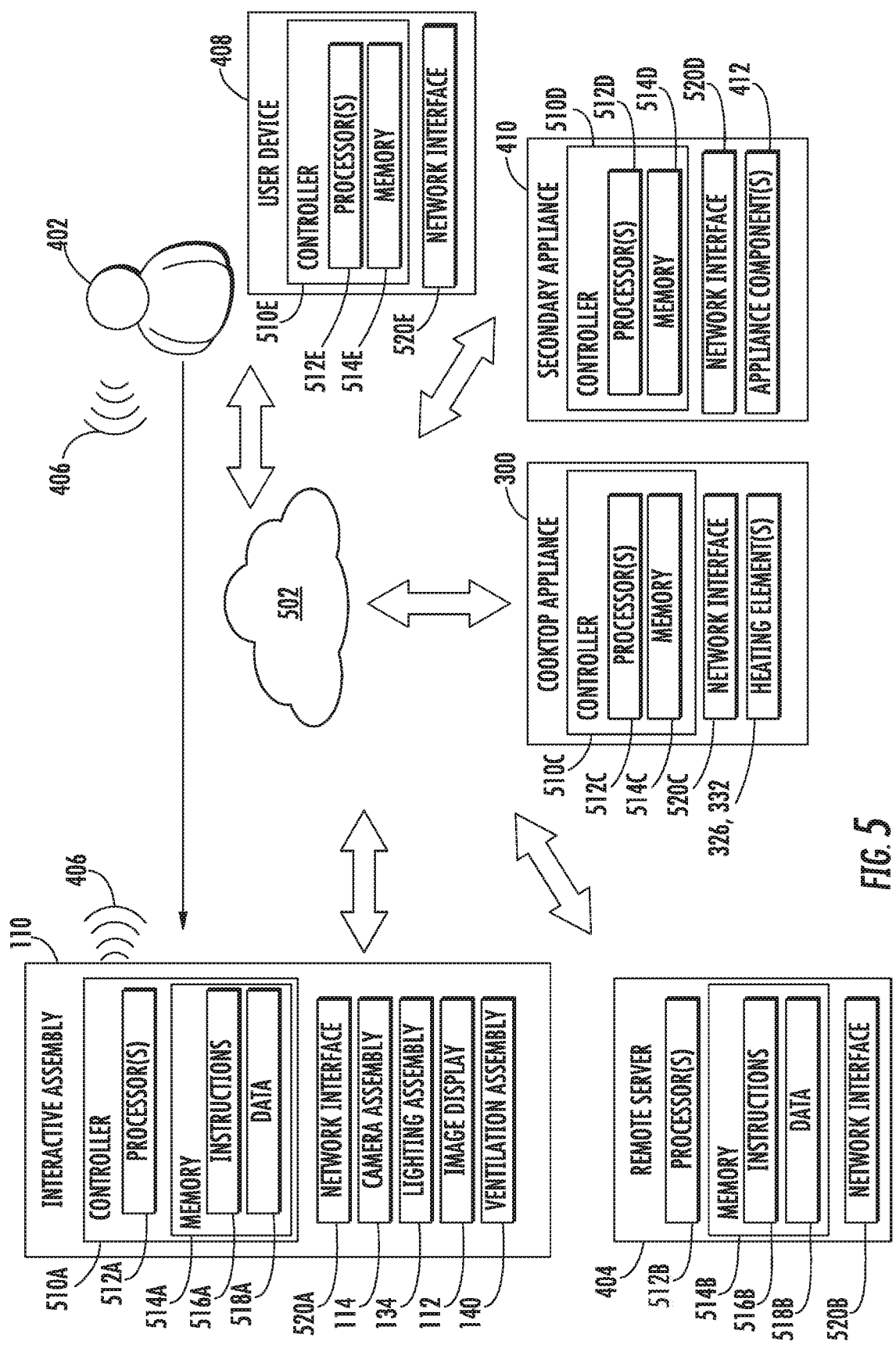
FIG. 5 provides a schematic view of a system for engaging one or more appliances according to exemplary embodiments of the present disclosure.

In some embodiments, controller 510C includes one or more memory devices 514C and one or more processors 512C (FIG. 5). The processors 512C can be any combination of general or special purpose processors, CPUs, or the like that can execute programming instructions or control code associated with operation of cooktop appliance 300. The memory devices 514C (i.e., memory) may represent random access memory such as DRAM or read only memory such as ROM or FLASH. In one embodiment, the processor 512C executes programming instructions stored in memory 514C. The memory 514C may be a separate component from the processor 512C or may be included onboard within the processor 512C. Alternatively, controller 510C may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 510C includes a network interface 520C (FIG. 5) such that controller 510C can connect to and communicate over one or more networks (e.g., network 502—FIG. 5) with one or more network nodes. Controller 510C can also include one or more transmitting, receiving, or transceiving components for transmitting/receiving communications with other devices communicatively coupled with cooktop appliance 300. Additionally or alternatively, one or more transmitting, receiving, or transceiving components can be located off board controller 510C. Generally, controller 510C can be positioned in any suitable location throughout cooktop appliance 300. For example, controller 510C may be located proximate user interface panel 334 toward front portion of cooktop appliance 300.

In some embodiments, cooktop controller 510C is provided as or as part of controller 510A. In alternative embodiments, cooktop controller 510C is a discrete unit in selective operable communication with controller 510A, as will be described in detail below.

As shown, one or more casings (e.g., hood casing 116) may be provided above cooktop appliance 300 along the vertical direction V. For example, a hood casing 116 may be positioned above cooktop appliance 300. Hood casing 116 includes a plurality of outer walls and generally extends along the vertical direction V between a top end 118 and a bottom end 120; along the lateral direction L between a first side end 122 and a second side end 124; and along the transverse direction T between a front end 126 and a rear end 128. In some embodiments, hood casing 116 is spaced apart from cooktop surface 324 along the vertical direction V. An open region 130 may thus be defined along the vertical direction V between cooktop surface 324 and bottom end 120.

In optional embodiments, hood casing 116 is formed as a range hood. As will be described in detail below, a ventilation assembly 140 within hood casing 116 may thus direct an airflow from the open region 130 and through hood casing 116. However, a range hood is provided by way of example only. Other configurations may be used within the spirit and scope of the present disclosure. For example, hood casing 116 could be part of a microwave or other appliance designed to be located over cooktop surface 324. Moreover, although a generally rectangular shape is illustrated, any suitable shape or style may be adapted to form the structure of hood casing 116.

In certain embodiments, multiple camera assemblies 114A, 114B are provided to capture images (e.g., static images or dynamic video) of a portion of cooktop appliance 300 or an area adjacent to cooktop appliance 300. Generally, each camera assembly 114A, 114B may be any type of device suitable for capturing a picture or video. As an example, each camera assembly 114A, 114B may be a video camera or a digital camera with an electronic image sensor (e.g., a charge coupled device (CCD) or a CMOS sensor). Camera assembly 114A or 114B is in operable communication with controller 510A such that controller 510A may receive an image signal from camera assembly 114A or 114B corresponding to the picture captured by camera assembly 114A or 114B. Once received by controller 510A, the image signal may be further processed at controller 510A or transmitted to a separate device (e.g., remote server 404—FIG. 5) in live or real-time for remote viewing (e.g., via one or more social media platforms). Optionally, one or more microphones (not pictured) may be associated with one or more of the camera assemblies 114A, 114B to capture and transmit audio signal(s) coinciding (or otherwise corresponding) with the captured image signal(s).

In some embodiments, one camera assembly (e.g., first camera assembly 114A) is directed at cooktop surface 324. In other words, first camera assembly 114A is oriented to capture light emitted or reflected from cooktop surface 324 through the open region 130. Thus, first camera assembly 114A may selectively capture an image covering all or some of cooktop surface 324. For instance, first camera assembly 114A may capture an image covering one or more heating elements 326 of cooktop appliance 300. Optionally, first camera assembly 114A may be directed such that a line of sight is defined from first camera assembly 114A that is perpendicular to cooktop surface 324.

As shown, first camera assembly 114A is positioned above cooktop surface 324 (e.g., along the vertical direction V). In some such embodiments, first camera assembly 114A is mounted (e.g., fixedly or removably) to hood casing 116. A cross-brace 132 extending across hood casing 116 (e.g., along the transverse direction T) may support first camera assembly 114A. When assembled, first camera assembly 114A may be positioned directly above cooktop surface 324.

In additional or alternative embodiments, another camera assembly (e.g., second camera assembly 114B) is directed away from cooktop surface 324. In other words, second camera assembly 114B is oriented to capture light emitted or reflected from an area other than cooktop surface 324. In particular, second camera assembly 114B may be directed at the area in front of cooktop appliance 300 (e.g., directly forward from cooktop appliance 300 along the transverse direction T). Thus, second camera assembly 114B may selectively capture an image of the area in front of cooktop surface 324. This area may correspond to or cover the location where a user would stand during use of one or more heating elements 326. During use, a user's face or body may be captured by second camera assembly 114B while the user is standing directly in front of cooktop appliance 300. Optionally, second camera assembly 114B may be directed such that a line of sight is defined from second camera assembly 114B that is non-orthogonal to cooktop surface 324 (e.g., between 0° and 45° relative to a plane parallel to cooktop surface 324). The captured images from second camera assembly 114B may be suitable for transmission to a remote device or may be processed as a gesture control signal for a portion of interactive assembly 110 (e.g., to engage a graphical user interface displayed at image monitor 112).

As shown, second camera assembly 114B is positioned above cooktop surface 324 (e.g., along the vertical direction V). In some such embodiments, such as that illustrated in FIGS. 1 and 2, second camera assembly 114B is mounted (e.g., fixedly or removably) to a front portion of hood casing 116 (e.g., at image monitor 112). When assembled, second camera assembly 114B may be positioned directly above cooktop surface 324 or, additionally, forward from cooktop appliance 300 along the transverse direction T.

In some embodiments, a lighting assembly 134 is provided above cooktop surface 324 (e.g., along the vertical direction V). For instance, lighting assembly 134 may be mounted to hood casing 116 (e.g., directly above cooktop surface 324). Generally, lighting assembly 134 includes one or more selectable light sources directed toward cooktop surface 324. In other words, lighting assembly 134 is oriented to project a light (as indicated at arrows 136) to cooktop appliance 300 through open region 130 and illuminate at least a portion of cooktop surface 324. The light sources may include any suitable light-emitting elements, such as one or more light emitting diode (LED), incandescent bulb, fluorescent bulb, halogen bulb, etc.

During use, lighting assembly 134 may be selectively activated to illuminate a portion of cooktop appliance 300 (e.g., cooktop surface 324) based on a received light visibility signal. For instance, lighting assembly 134 may be activated by controller 510A based on direct user input (e.g., depressing a dedicated switch, a gesture control signal, voice control signal, etc.). In other words, the light visibility signal may be an isolated user input signal.

Alternatively, the light visibility signal may be an automatically-generated signal that does not require direct user input. The light visibility signal may indicate additional light is needed above cooktop appliance 300. In turn, controller 510A may automatically activate lighting assembly 134 based on a determined condition. Optionally, controller 510A may vary the activation or light intensity (i.e., luminance) of the light 136 from lighting assembly 134 based on the ambient conditions (e.g., through the open region 130 between cooktop surface 324 and hood casing 116). For instance, an ambient light sensor 115 may be positioned above cooktop surface 324 (e.g., directly above cooktop surface 324). In some such embodiments, ambient light sensor 115 detects the light available at first camera assembly 114A and transmits a corresponding light visibility signal to controller 510A. Based on the received light visibility signal, controller 510A may direct lighting assembly 134 to activate/deactivate or increase/decrease the intensity of light 136 projected towards cooktop surface 324.

In some embodiments, image monitor 112 is provided above cooktop surface 324 (e.g., along the vertical direction V). For instance, image monitor 112 may be mounted to hood casing 116 (e.g., directly above cooktop surface 324). Generally, image monitor 112 may be any suitable type of mechanism for visually presenting a digital (e.g., interactive) image. For example, image monitor 112 may be a liquid crystal display (LCD), a plasma display panel (PDP), a cathode ray tube (CRT) display, etc. Thus, image monitor 112 includes an imaging surface 138 (e.g., screen or display panel) at which the digital image is presented or displayed as an optically-viewable picture (e.g., static image or dynamic video) to a user. The optically-viewable picture may correspond to any suitable signal or data received or stored by interactive assembly 110 (e.g., at controller 510A). As an example, image monitor 112 may present recipe information in the form of viewable text or images. As another example, image monitor 112 may present a remotely captured image, such as a live (e.g., real-time) dynamic video stream received from a separate user or device. As yet another example, image monitor 112 may present a graphical user interface (GUI) that allows a user to select or manipulate various operational features of interactive assembly 110 or cooktop appliance 300. During use of such GUI embodiments, a user may engage, select, or adjust the image presented at image monitor 112 through any suitable input, such as gesture controls detected through second camera assembly 114B, voice controls detected through one or more microphones, associated touch panels (e.g., capacitance or resistance touch panel) or sensors overlaid across imaging surface 138, etc.

As illustrated, the imaging surface 138 generally faces, or is directed, away from cooktop surface 324. In particular, the imaging surface 138 is directed toward the area forward from the cooktop appliance 300. During use, a user standing in front of cooktop appliance 300 may thus see the optically-viewable picture (e.g., recipe, dynamic video stream, graphical user interface, etc.) displayed at the imaging surface 138. Optionally, the imaging surface 138 may be positioned at a rearward non-orthogonal angle relative to the vertical direction V. In other words, the imaging surface 138 may be inclined such that an upper edge of the imaging surface 138 is closer to the rear end 128 of hood casing 116 than a lower edge of the imaging surface 138 is. In some such embodiments, the non-orthogonal angle is between 1° and 15° relative to the vertical direction V. In certain embodiments, the non-orthogonal angle is between 2° and 7° relative to the vertical direction V.

Figure 4:
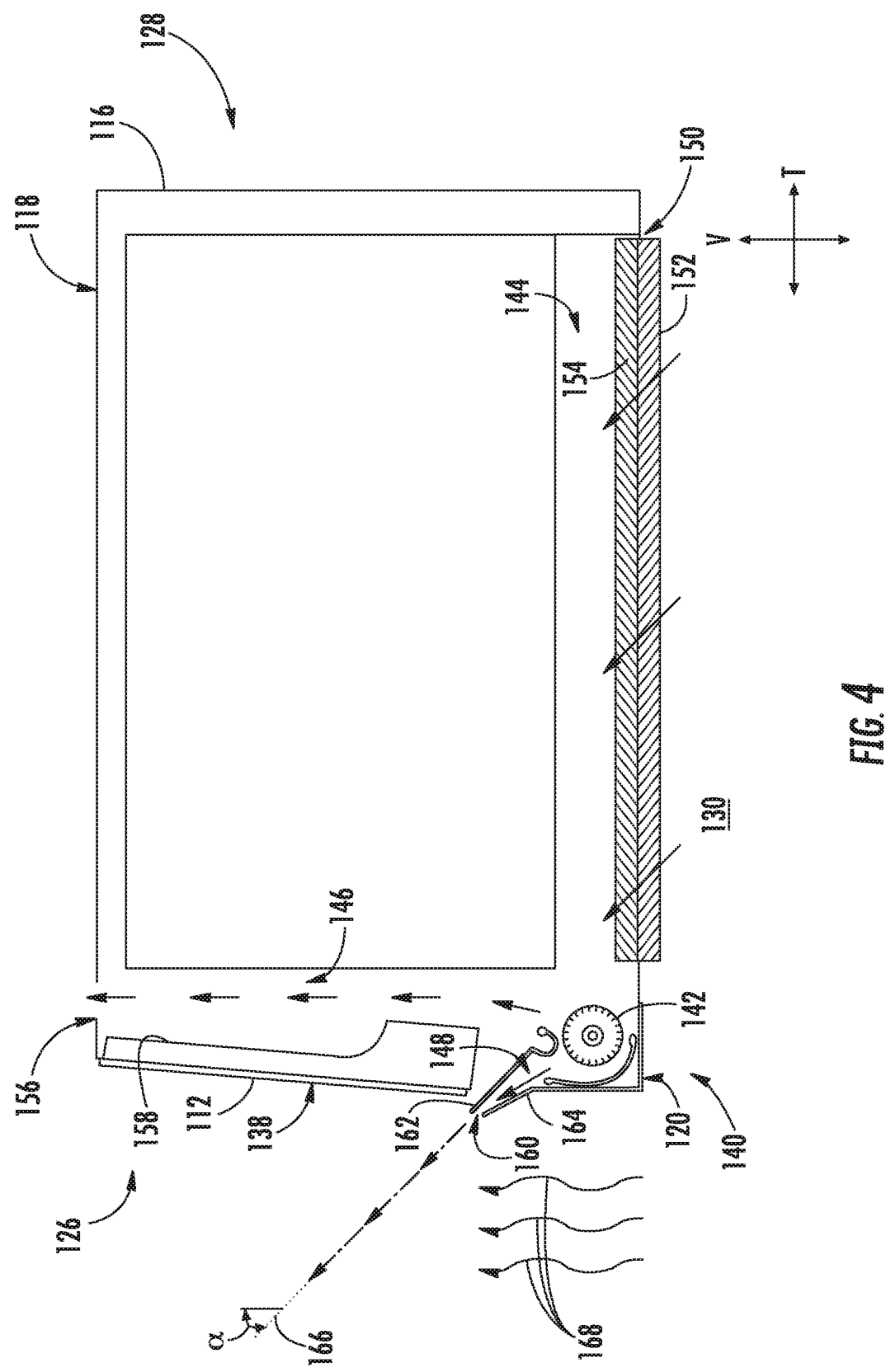
FIG. 4 provides a magnified side schematic view of a portion of the exemplary system of FIG. 1.

Turning now to FIGS. 1 through 4, FIG. 4 provides a magnified side schematic view a portion of interactive assembly 110 is provided. In particular, a ventilation assembly 140 included in exemplary embodiments of interactive assembly 110 is shown. As illustrated, ventilation assembly 140 is generally provided above cooktop appliance 300. In some embodiments, hood casing 116 may be included as part of ventilation assembly 140 (as shown in FIG. 4), or independent thereof. Moreover, as noted above, image monitor 112 may be mounted to hood casing 116 (e.g., at the front end 126).

In the exemplary embodiments of FIGS. 1 through 4, ventilation assembly 140 includes hood casing 116 and an air handler 142 (e.g., fan or blower) in fluid communication with hood casing 116 to motivate an airflow through one or more passages 144, 146, 148 defined within hood casing 116. For example, air handler 142 may be rotatably mounted within hood casing 116 (e.g., below image monitor 112). In some such embodiments, air handler 142 is downstream from one or more intake passages 144 and upstream from one or more exhaust passages 146, 148. One or more air inlets 150 and air outlets 156, 160 are defined through hood casing 116 (e.g., through an outer wall of hood casing 116) in fluid communication with passages 144, 146, 148.

As shown in FIG. 4, one air inlet 150 may be defined through hood casing 116 at the bottom end 120 (e.g., directly above cooktop surface 324—FIG. 2). Thus, the airflow motivated by air handler 142 may be directed from open region 130 to intake passage 144 through air inlet 150. Optionally, one or more filters 152, 154 may be provided at air inlet 150 (e.g., between open region 130 and intake passage 144) to clean the airflow as it enters hood casing 116. For instance, a grease filter 152 having a suitable coarse filter medium, such as a metallic mesh including aluminum or stainless steel, may be mounted across air inlet 150. Additionally or alternatively, an odor filter 154 having a suitable fine filter medium, such as a mesh or block including activated carbon, may be mounted across air inlet 150. Optionally, odor filter 154 may be positioned above or downstream from grease filter 152.

In certain embodiments, an upper air outlet 156 is defined through hood casing 116. For instance, upper air outlet 156 may be defined through hood casing 116 at the top end 118. In particular, upper air outlet 156 may extend along the vertical direction V at a portion of the casing wall between the front end 126 and rear end 128 along the transverse direction T. Thus, at least a portion of the airflow motivated by air handler 142 may be directed from intake passage 144 to the ambient environment above hood casing 116 through upper air outlet 156. In some such embodiments, a vertical exhaust passage 146 may be defined within hood casing 116 (e.g., downstream from air handler 142). Optionally, vertical exhaust passage 146 may be positioned rearward from image monitor 112 along the transverse direction T. In some such embodiments, an internal wall 158 is positioned between the image monitor 112 and the exhaust passage 146 along the transverse direction T (e.g., such that internal wall 158 separates image monitor 112 and vertical exhaust passage 146 with respect to the transverse direction T, as illustrated in FIG. 4). Advantageously, the airflow across internal wall 158 may convectively cool the electronic components within hood casing 116 [e.g., image monitor 112, controller 510A (FIG. 5), etc.]. Moreover, cooling may occur without passing the airflow directly across such electronic components.

In further embodiments, a curtain air outlet 160 is defined through hood casing 116. As shown, curtain air outlet 160 is defined though hood casing 116 at the front end 126. Curtain air outlet 160 is defined below image monitor 112 and may be positioned forward from image monitor 112 (e.g., along the transverse direction T). Thus, at least a portion of the airflow motivated by air handler 142 may be directed from intake passage 144 to the ambient environment in front of hood casing 116 and image monitor 112 through curtain air outlet 160. A narrowing exhaust passage 148 may be defined by one or more guide walls 164, 166 downstream from air handler 142. For instance, a top guide wall 162 and a bottom guide wall 164 may be tapered toward each other along the narrowing exhaust passage 148. In some such embodiments, curtain air outlet 160 is defined between the outer edges of top guide wall 162 and bottom guide wall 164.

An airflow curtain path 168 is generally defined by curtain air outlet 160. Thus, air exhausted through curtain air outlet 160 is projected from hood casing 116 along airflow curtain path 168, forming a curtain or blade of fast-moving air in front of hood casing 116. In certain embodiments, airflow curtain path 168 is defined to have an acute angle $\alpha$ with respect to (i.e., relative to) the vertical direction V. Thus, airflow curtain path 168 (and its associated curtain of air) extends from hood casing 116 or imaging surface 138 along acute angle $\alpha$. During use, heat or steam (e.g., as represented by arrows 168) generated at cooktop appliance 300 (or another location directly beneath curtain air outlet 160) may be advantageously blocked or restricted by the mass of air flowing along airflow curtain path 168. In turn, the visibility at imaging surface 138 or camera assembly 114A or 114B may be preserved, while further protecting various electronic components [e.g., image monitor 112, camera assemblies 114A or 114B (FIG. 2), controller 510A (FIG. 2), etc.] mounted within hood casing 116 from damage that may be caused by heat or steam 168.

In some embodiments, acute angle $\alpha$ is between 10° and 60° relative to vertical direction V. In other embodiments, acute angle $\alpha$ is between 20° and 50°. In still other embodiments, acute angle $\alpha$ is between 30° and 40° relative to vertical direction V.

FIG. 5 provides a schematic view of a system for engaging one or more appliances, such as cooktop appliance 300 and one or more secondary appliances 410, according to exemplary embodiments of the present disclosure. As shown, interactive assembly 110 can be communicatively coupled with network 502 and various other nodes, such as a remote server 404, cooktop appliance 300, one or more secondary appliances 410, and one or more user devices 408. Moreover, one or more users 402 can be in operative communication with interactive assembly 110 by various methods, including voice control or gesture recognition, for example. Additionally, or alternatively, although network 502 is shown, interactive assembly 110, cooktop appliance 300, secondary appliance 410, user device 408, or other devices within system 100 need not be communicatively coupled via network 502; rather, interactive assembly 110 and various other devices of system 100 can be communicatively coupled via any suitable wired or wireless means not over network 502, such as, for example, via physical wires, transceiving, transmitting, or receiving components.

As noted above, interactive assembly 110 may include a controller 510A operably coupled to one or more camera assemblies 114, lighting assemblies 134, image monitors 110, and ventilation assemblies 140. Controller 510A may include one or more processors 512A and one or more memory devices 514A (i.e., memory). The one or more processors 512A can be any suitable processing device (e.g., a processor core, a microprocessor, an ASIC, a FPGA, a microcontroller, etc.) and can be one processor or a plurality of processors that are operatively connected. The memory device 514A can include one or more non-transitory computer-readable storage mediums, such as RAM, ROM, EEPROM, EPROM, flash memory device, magnetic disks, etc., and combinations thereof. The memory devices 514A can store data 518A and instructions 516A that are executed by the processor 512A to cause interactive assembly 110 to perform operations. For example, instructions 516A could be instructions for voice recognition, instructions for gesture recognition, receiving/transmitting images or image signals from camera assembly 114, directing activation of lighting assembly 134, directing activation of ventilation assembly 140 (e.g., at air handler 142—FIG. 4), or projecting images at image monitor 112. The memory devices 514A may also include data 518A, such as captured image data, recipe data, etc., that can be retrieved, manipulated, created, or stored by processor 512A.

Controller 510A includes a network interface 520A such that interactive assembly 110 can connect to and communicate over one or more networks (e.g., network 502) with one or more network nodes. Network interface 520A can be an onboard component of controller 510A or it can be a separate, off board component. Controller 510A can also include one or more transmitting, receiving, or transceiving components for transmitting/receiving communications with other devices communicatively coupled with interactive assembly 110. Additionally or alternatively, one or more transmitting, receiving, or transceiving components can be located off board controller 510A.

Network 502 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 502 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 404, such as a web server, is in operable communication with interactive assembly 110. The server 404 can be used to host a social media platform (e.g., FACEBOOK™, INSTAGRAM™, SNAPCHAT™, TWITTER™, etc.). In other words, remote server 404 may be a social media platform server. Additionally or alternatively, the server 404 can be used to host an information database (e.g., recipe database). The server can be implemented using any suitable computing device(s). The server 404 may include one or more processors 512B and one or more memory devices 514B (i.e., memory). The one or more processors 512B can be any suitable processing device (e.g., a processor core, a microprocessor, an ASIC, a FPGA, a microcontroller, etc.) and can be one processor or a plurality of processors that are operatively connected. The memory device 512B can include one or more non-transitory computer-readable storage mediums, such as RAM, ROM, EEPROM, EPROM, flash memory devices, magnetic disks, etc., and combinations thereof. The memory devices 514B can store data 518B and instructions 516B which are executed by the processor 512B to cause remote server 404 to perform operations. For example, instructions 516B could be instructions for receiving/transmitting images or image signals, transmitting/receiving recipe signals, etc.

The memory devices 514B may also include data 518B, such as social media data, image data, etc., that can be retrieved, manipulated, created, or stored by processor 512B. The data 518B can be stored in one or more databases. The one or more databases can be connected to remote server 404 by a high bandwidth LAN or WAN, or can also be connected to remote server 404 through network 502. The one or more databases can be split up so that they are located in multiple locales.

Remote server 404 includes a network interface 520B such that remote server 404 can connect to and communicate over one or more networks (e.g., network 502) with one or more network nodes. Network interface 520B can be an onboard component or it can be a separate, off board component. In turn, remote server 404 can exchange data with one or more nodes over the network 502. In particular, remote server 404 can exchange data with interactive assembly 110. Although not pictured, it is understood that remote server 404 may further exchange data with any number of client devices over the network 502. The client devices can be any suitable type of computing device, such as a general purpose computer, special purpose computer, laptop, desktop, integrated circuit, mobile device, smartphone, tablet, or other suitable computing device. In the case of a social media platform, images (e.g., static images or dynamic video), audio, or text may thus be exchanged between interactive assembly 110 and various separate client devices through remote server 404.

In certain embodiments, cooktop appliance 300 is in operable communication with interactive assembly 110 via network 502. In turn, controller 510C of cooktop appliance 300 may exchange signals with interactive assembly 110. Optionally, one or more portions of cooktop appliance 300 may be controlled according to signals received from controller 510A of interactive assembly 110. For instance, one or more heating elements 326, 332 of cooktop appliance 300 may be activated or directed to a specific heat output (e.g., in units of British Thermal Units or temperature) based on one or more instruction signals received from controller 510A of interactive assembly 110 or remote server 404.

In additional or alternative embodiments, one or more secondary appliances 410 are in operable communication with interactive assembly 110. In turn, a controller 510D of secondary appliance 410 may exchange signals with interactive assembly 110.

Figure 10:
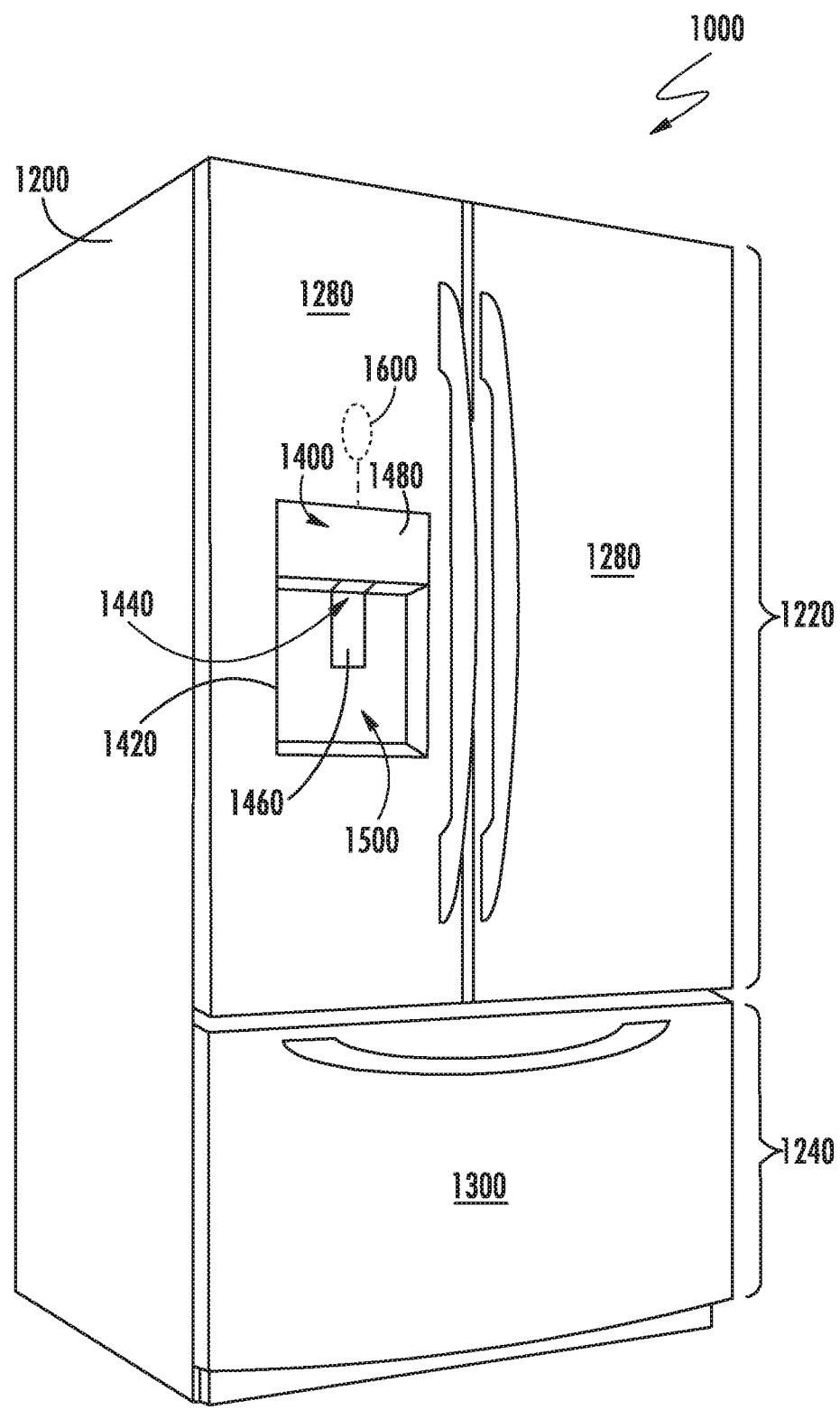
FIG. 10 provides a perspective view of a refrigerator appliance for use with a system according to exemplary embodiments of the present disclosure.

Turning briefly to FIG. 10, one secondary appliance 410 may be provided as a refrigerator appliance 1000. However, it is understood that any other suitable appliance may be provided as a secondary appliance 410, such as a microwave, television, connected security camera, etc.

Generally, refrigerator appliance 1000 includes a cabinet or cabinet 1200 that defines chilled chambers for receipt of food items for storage. In particular, cabinet 1200 defines a fresh food chamber 1220 positioned at or adjacent the top of cabinet 1200 and a freezer chamber 1240 arranged at or adjacent the bottom of cabinet 1200. As such, refrigerator appliance 1000 is generally referred to as a bottom mount refrigerator. It is recognized, however, any other suitable appliance or refrigerator style, such as, for example, a top mount refrigerator appliance, a side-by-side style refrigerator appliance, or a range appliance. Consequently, the description set forth herein is for illustrative purposes only and is not intended to be limiting in any aspect to any particular refrigerator chamber configuration.

Refrigerator doors 1280 are rotatably hinged to an edge of cabinet 1200 for selectively accessing fresh food chamber 1220. In addition, a freezer door 1300 is arranged below refrigerator doors 1280 for selectively accessing freezer chamber 1240. Freezer door 1300 is attached to a freezer drawer (not shown) slidably mounted within freezer chamber 1240. Refrigerator doors 1280 and freezer door 1300 are shown in the closed configuration in FIG. 10.

In some embodiments, refrigerator appliance 1000 also includes a dispensing assembly 1400 for dispensing liquid water or ice. Dispensing assembly 1400 includes a dispenser 1420 positioned on or mounted to an exterior portion of refrigerator appliance 1000, e.g., on one of refrigerator doors 1280. Dispenser 1420 includes a discharging outlet 1440 for accessing ice and liquid water. An actuating mechanism 1460, shown as a paddle, is mounted below discharging outlet 144 for operating dispenser 1420. In alternative exemplary embodiments, any suitable actuating mechanism may be used to operate dispenser 1420. For example, dispenser 142 can include a sensor (such as an ultrasonic sensor) or a button rather than the paddle. A user interface panel 1480 is provided for controlling the mode of operation. For example, user interface panel 1480 includes a plurality of user inputs (not labeled), such as a water dispensing button and an ice-dispensing button (e.g., for selecting a desired mode of operation such as crushed or non-crushed ice).

Discharging outlet 1440 and actuating mechanism 1460 are an external part of dispenser 1420 and are mounted in a dispenser recess 1500. Dispenser recess 1500 is positioned at a predetermined elevation convenient for a user to access ice or water and enabling the user to access ice without the need to bend-over and without the need to open refrigerator doors 1280.

As is generally understood, various storage components are mounted within fresh food chamber 1220 to facilitate storage of food items therein. For example, the storage components may include storage bins, drawers, and shelves that are mounted within fresh food chamber 1220. In certain embodiments, an internal camera assembly 1600 is provided within cabinet 1200 (e.g., within door 1280). Moreover, internal camera assembly 1600 may be operably coupled to controller 510D (FIG. 5) and directed at fresh food chamber 1220. In turn, internal camera assembly 1600 may capture an image of at least a portion of fresh food chamber 1220 (e.g., when door 1280 is in the closed position). During use, images captured at internal camera assembly 1600 may be transmitted (e.g., as image signals) to image monitor 112 (FIG. 5), thereby allowing a user to view the contents of refrigerator appliance 1000 while positioned at interactive assembly 110 or cooktop appliance 300.

Operation of the refrigerator appliance 1000 can be generally controlled or regulated by a controller 510D (FIG. 5) operably coupled to user interface panel 1480 and other components of refrigerator appliance 1000. User interface panel 1480 provides selections for user manipulation of the operation of refrigerator appliance 1000. As an example, user interface panel 1480 may provide for selections between whole or crushed ice, chilled water, or specific modes of operation. In response to one or more input signals (e.g., local input sensors from user manipulation of user interface panel 1480 or remote signals from another appliance), controller 510D may operate various components of the refrigerator appliance 1000. For example, controller 510D may receive a remote signal from interactive assembly 110 (FIG. 5) that specifies a set volume of water to be provided from dispenser 1420. Upon receiving such a signal, controller 510D may direct dispenser 1420 to provide the set volume of water (e.g., corresponding to a selected recipe) in response to the next engagement of actuating mechanism 1460. Advantageously, a user may be saved from the inconvenience of having to manually measure the set volume of water.

Returning to FIG. 5, controller 510D may include one or more processors 512D and one or more memory devices 514D (i.e., memory). The one or more processors 512D can be any suitable processing device (e.g., a processor core, a microprocessor, an ASIC, a FPGA, a microcontroller, etc.) and can be one processor or a plurality of processors that are operatively connected. The memory device 514D can include one or more non-transitory computer-readable storage mediums, such as RAM, ROM, EEPROM, EPROM, flash memory devices, magnetic disks, etc., and combinations thereof. The memory devices 514D can store data and instructions that are executed by the processor 512D to cause secondary appliance 410 to perform operations. For example, instructions could be instructions for receiving/transmitting images or image signals (e.g., as captured from internal camera assembly 1600—FIG. 10), directing activation of one or more appliance components 412 (e.g., dispenser 1420—FIG. 10), etc.

Controller 510D includes a network interface 520D such that secondary appliance 410 can connect to and communicate over one or more networks (e.g., network 502) with one or more network nodes. Network interface 520D can be an onboard component of controller 510D or it can be a separate, off board component. Controller 510D can also include one or more transmitting, receiving, or transceiving components for transmitting/receiving communications with other devices communicatively coupled across network 502. Additionally or alternatively, one or more transmitting, receiving, or transceiving components can be located off board controller 510D.

In certain embodiments, a user device 408 is communicatively coupled with network 502 such that user device 408 can communicate with interactive assembly 110. User device 408 can communicate directly with interactive assembly 110 via network 502. Alternatively, user device 408 can communicate indirectly with interactive assembly 110 by communicating via network 502 with remote server 404, which in turn communicates with interactive assembly 110 via network 502. Moreover, user 402 can be in operative communication with user device 408 such that user 402 can communicate with interactive assembly 110 via user device 408.

User device 408 can be any type of device, such as, for example, a personal computing device (e.g., laptop or desktop), a mobile computing device (e.g., smartphone or tablet), a gaming console or controller, a wearable computing device, an embedded computing device, a remote, or any other suitable type of user computing device. User device 408 can include one or more user device controllers 510E. Controller 510E can include one or more processors 512E and one or more memory devices 514E. The one or more processors 512E can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor 512E to cause user device 408 to perform operations. Controller 510E a user device network interface 520E such that user device 408 can connect to and communicate over one or more networks (e.g., network 502) with one or more network nodes. Network interface 520E can be an onboard component of controller 510E or it can be a separate, off board component. Controller 510E can also include one or more transmitting, receiving, or transceiving components for transmitting/receiving communications with other devices communicatively coupled with user device 408. Additionally or alternatively, one or more transmitting, receiving, or transceiving components can be located off board controller 510E.

User device 408 can include one or more user inputs such as, for example, buttons, one or more cameras, or a monitor configured to display graphical user interfaces or other visual representations to user. For example, display can display graphical user interfaces corresponding to operational features of interactive assembly 110 such that user may manipulate or select the features to operate interactive assembly 110. Display can be a touch sensitive component (e.g., a touch-sensitive display screen or a touch pad) that is sensitive to the touch of a user input object (e.g., a finger or a stylus). For example, a user may touch the display with his or her finger and type in a series of numbers on the display. In addition, motion of the user input object relative to the display can enable user to provide input to user device 408. User device 408 may provide other suitable methods for providing input to user device 408 as well. Moreover, user device 408 can include one or more speakers, one or more cameras, or more than one microphones such that user device 408 is configured with voice control, motion detection, and other functionality.

Generally, user 402 may be in operative communication with interactive assembly 110, cooktop appliance 300, secondary appliance 410, or one or more user devices 408. In some exemplary embodiments, user 402 can communicate with devices (e.g., interactive assembly 110) using voice control 406. User 402 may also be in operative communication via other methods as well, such as visual communication.

User 402 may wish to operate interactive assembly 110 remotely. In particular, user may wish to operate operational features that include activating portions of interactive assembly 110 (e.g., camera assembly 114, lighting assembly 134, image monitor 112, or ventilation assembly 140), turning on cooktop appliance 300, selecting a temperature or heat setting for cooktop appliance 300, or choosing a mode of operation of interactive assembly 110.

Figure 6:
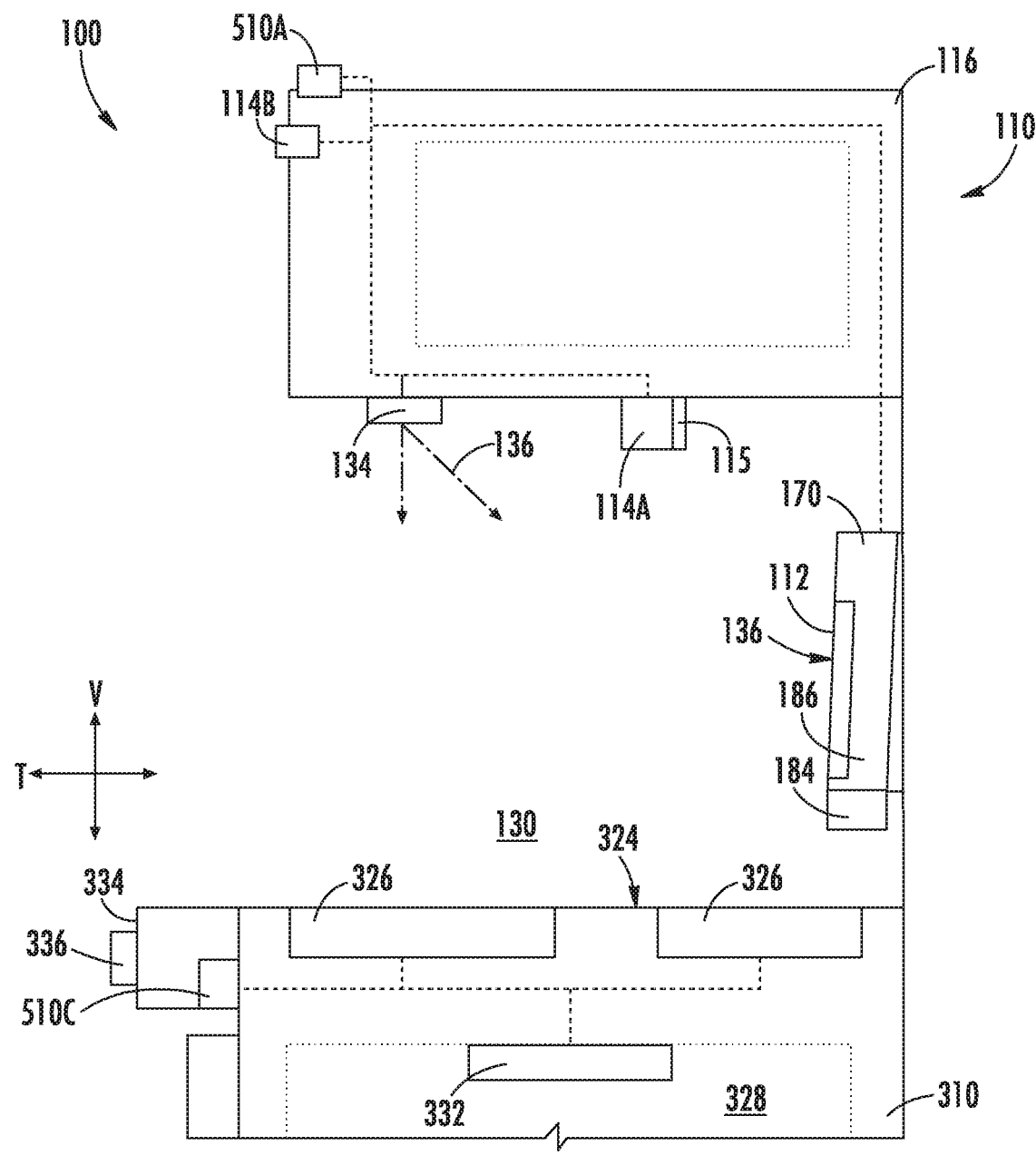
FIG. 6 provides a side schematic view of a system according to exemplary embodiments of the present disclosure.
Figure 8:
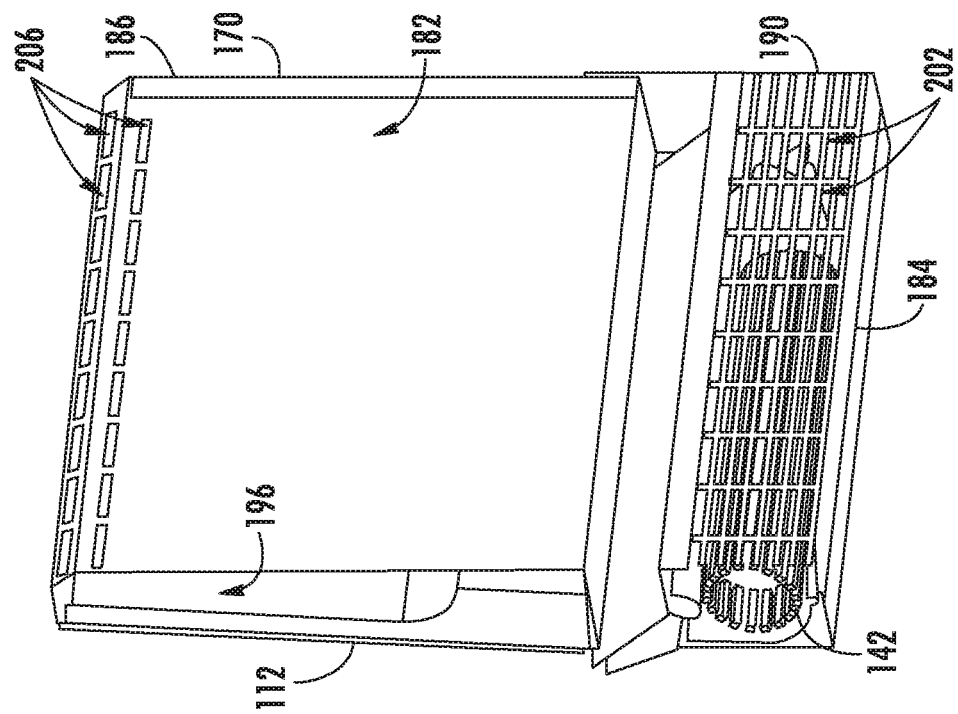
FIG. 8 provides a rear, partial cross-section perspective view of a portion of the exemplary system of FIG. 6.
Figure 7:
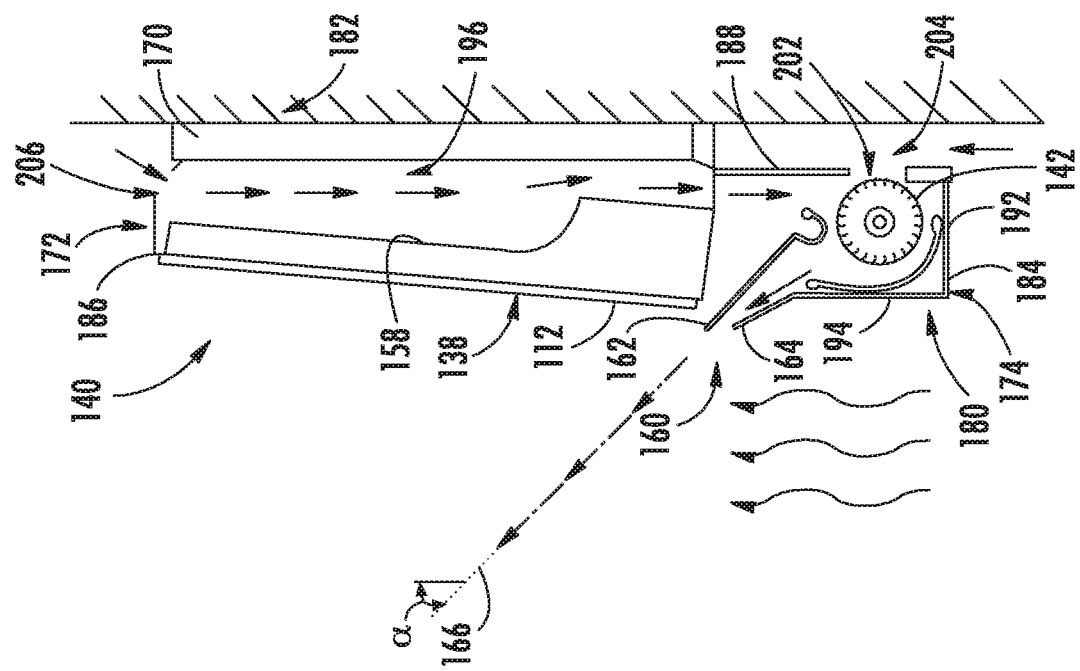
FIG. 7 provides a magnified side schematic view of a portion of the exemplary system of FIG. 6.

Turning now to FIGS. 6 through 8, various views are provided of system 100 according to alternative exemplary embodiments. Except as otherwise indicated, it is understood that the embodiments of FIGS. 6 through 8, are substantially similar to the embodiments described above with respect to FIGS. 1 through 5. In turn, the same numerals are generally used throughout. Moreover, it is also understood that the embodiments of FIGS. 6 through 8 include or could be modified to include features of the embodiments of FIGS. 1 through 5, and vice versa, except as otherwise indicated. For example, although a hood casing 116 is illustrated in FIGS. 1 through 5, further embodiments may include a backsplash casing 170 in addition to or in alternative to hood casing 116.

As shown, backsplash casing 170 may be provided above cooktop appliance 300 along the vertical direction V. For example, a backsplash casing 170 may be positioned above cooktop appliance 300. Backsplash casing 170 includes a plurality of outer walls and generally extends along the vertical direction V between a top end 172 and a bottom end 174, along the lateral direction L between a first side end and a second side end, and along the transverse direction T between a front end 180 and a rear end 182. In some embodiments, backsplash casing 170 is spaced apart from cooktop surface 324 along the vertical direction V.

As shown, ventilation assembly 140 is generally provided above cooktop appliance 300. In some embodiments, backsplash casing 170 may be included as part of ventilation assembly 140 (as illustrated in FIG. 6), or independent thereof.

In the exemplary embodiments of FIGS. 6 through 8, ventilation assembly 140 includes backsplash casing 170 and an air handler 142 (e.g., fan or blower) in fluid communication with backsplash casing 170 to motivate an airflow through one or more passages 196, 148 defined within backsplash casing 170. Backsplash casing 170 may include a bottom housing 184 proximal to the bottom end 174 (i.e., distal to the top end 172) and a top housing 186 proximal to the top end 172 (i.e., distal to the bottom end 174) on top of bottom housing 184. Each housing 184, 186 includes one or more walls to enclose or support separate components. For instance, bottom housing 184 may include a bottom rear wall 188, a pair of opposite bottom sidewalls 190, a base wall 192 extending between the bottom sidewalls 190 along the lateral direction L, and a front wall 194 spaced apart from the bottom rear wall 188 along the transverse direction T. As shown, air handler 142 may be rotatably mounted within bottom housing 184 while image monitor 112 is mounted thereabove to top housing 186.

In some embodiments, air handler 142 is downstream from one or more intake passages 196 and upstream from one or more exhaust passages 148. One or more air inlets 202, 206 and air outlets 160 are defined through backsplash casing 170 (e.g., through an outer wall of backsplash casing 170) in fluid communication with passages 196, 148.

In certain embodiments, one air inlet (e.g., hot air inlet 202) is defined through the bottom rear wall 188. In some such embodiments, bottom rear wall 188 is spaced apart from a fixed support surface (e.g., structural wall) along the transverse direction T such that a guide channel 204 is defined therebetween. Thus, air may flow through guide channel 204 (e.g., as motivated by air handler 142) and to hot air inlet 202 before entering backsplash casing 170.

In additional or alternative embodiments, another air inlet (e.g., cold air inlet 206) is defined through backsplash casing 170 proximal to the top end 118 (i.e., distal to the bottom end 120). In particular, cold air inlet 206 may extend along the vertical direction V at a portion of casing wall between the front end 180 and rear end 182 along the transverse direction T. Thus, relatively cool air from an ambient area above backsplash casing 170 may flow into backsplash panel through cold air inlet 206 (e.g., as motivated by air handler 142). In some such embodiments, a vertical intake passage 196 may be defined within backsplash casing 170 (e.g., upstream from air handler 142). Optionally, vertical intake passage 196 may be positioned rearward from image monitor 112 along the transverse direction T. In some such embodiments, an internal wall 158 is positioned between the image monitor 112 and the intake passage 196 along the transverse direction T (e.g., such that internal wall 158 separates image monitor 112 and vertical intake passage 196 with respect to the transverse direction T, as illustrated in FIG. 7). Advantageously, the airflow across internal wall 158 may convectively cool the electronic components within backsplash casing 170 [e.g., image monitor 112, controller 510A (FIG. 5), etc.]. Moreover, cooling may occur without passing the airflow directly across such electronic components.

In further embodiments, a curtain air outlet 160 is defined through backsplash casing 170. As shown, curtain air outlet 160 is defined though backsplash casing 170 at the front end 180. Curtain air outlet 160 is defined below image monitor 112 and may be positioned forward from image monitor 112 (e.g., along the transverse direction T). Thus, at least a portion of the airflow motivated by air handler 142 may be directed from air inlets 202, 206 to the ambient environment in front of backsplash casing 170 and image monitor 112 through curtain air outlet 160. A narrowing exhaust passage 148 may be defined by one or more guide walls 164, 166 downstream from air handler 142. For instance, a top guide wall 162 and a bottom guide wall 164 may be tapered toward each other along the narrowing exhaust passage 148. In some such embodiments, curtain air outlet 160 is defined between the edges of top guide wall 162 and bottom guide wall 164.

An airflow curtain path 168 is generally defined by curtain air outlet 160. Thus, air exhausted through curtain air outlet 160 is projected from backsplash casing 170 along airflow curtain path 168, forming a curtain of moving air in front of backsplash casing 170. In certain embodiments, airflow curtain path 168 is defined to have an acute angle α with respect to (i.e., relative to) the vertical direction V. Thus, airflow curtain path 166 extends from backsplash casing 170 or imaging surface 138 along acute angle α. During use, heat or steam (e.g., as represented by arrows 168) generated at cooktop appliance 300 (or another location directly beneath curtain air outlet 160 may be advantageously blocked or restricted by the mass of air flowing along airflow curtain path 168. In turn, the visibility at imaging surface 138 or a camera assembly 114A or 114B may be preserved, while further protecting various electronic components (e.g., image monitor 112, camera assembly 114A or 114B, controller 510A, etc.) within backsplash casing 170 from damage that may be caused by heat or steam 168.

In some embodiments, acute angle α is between 10° and 60° relative to vertical direction V. In other embodiments, acute angle α is between 20° and 50°. In still other embodiments, acute angle α is between 30° and 40° relative to vertical direction V.

Figure 9:
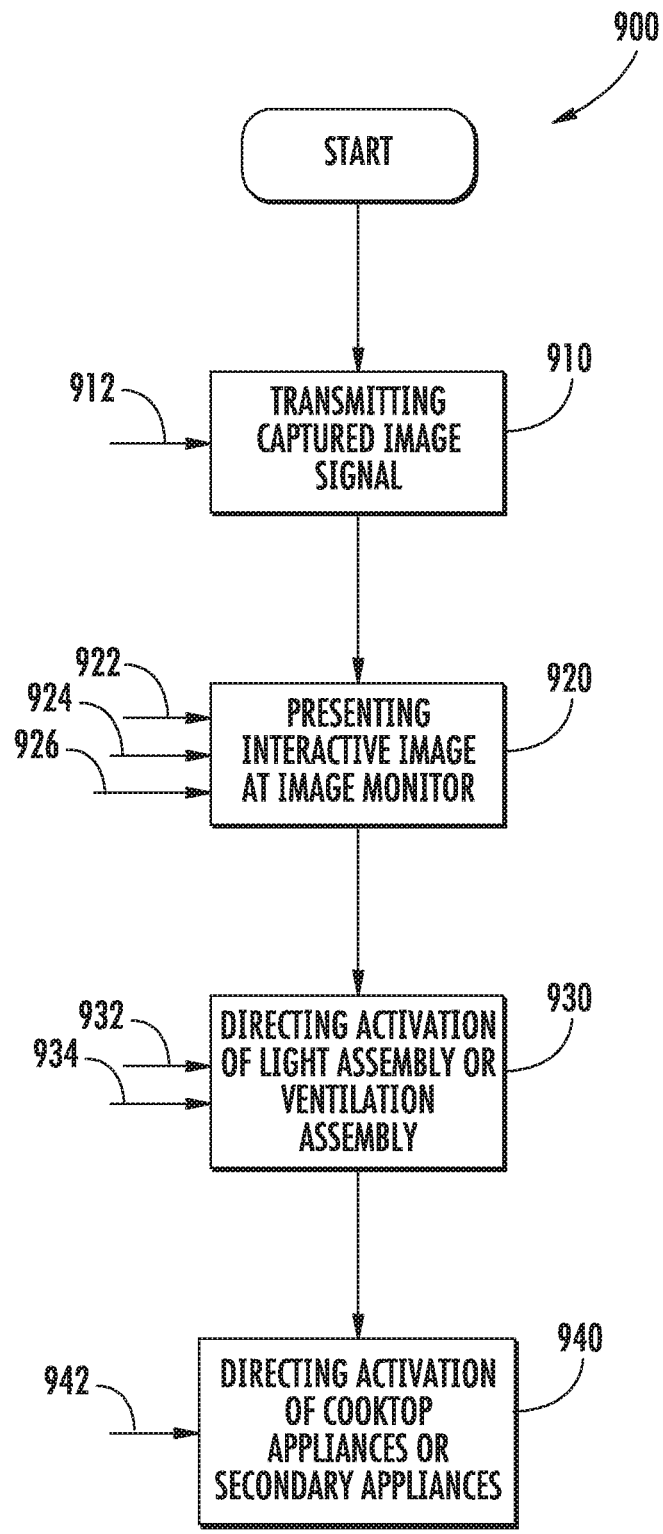
FIG. 9 provides a flow chart illustrating a method of operating a system according to exemplary embodiments of the present disclosure.

Referring now to FIG. 9, various methods may be provided for use with system 100 in accordance with the present disclosure. In general, the various steps of methods as disclosed herein may, in exemplary embodiments, be performed by the controller 510A as part of an operation that the controller 510A is configured to initiate (e.g., an interactive cooking operation). During such methods, controller 510A may receive inputs and transmit outputs from various other components of the system 100. For example, controller 510A may send signals to and receive signals from remote server 404, cooktop appliance 300, secondary appliance 410, or user device 408, as well as other components within interactive assembly 110. In particular, the present disclosure is further directed to methods, as indicated by 900, for operating system 100. Such methods advantageously facilitate sharing or viewing media (e.g., static images, dynamic video, audio, recipes, etc.) adjacent to cooktop appliance 300 and directing operations of one or more appliances. In certain embodiments, such methods may advantageously facilitate guided or recorded cooking instructions.

FIG. 9 depicts steps performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure.

At 910, the method 900 includes transmitting a captured image signal 912. In some embodiments, 910 is prompted by (e.g., in response to) or based on receiving the captured image signal 912. As described above, the captured image signal 912 may be received from a camera assembly positioned above a cooktop surface before being transmitted. Moreover, the captured image signal 912 may correspond to a view of, for example, the cooktop appliance or a user in front of the cooktop appliance. In some embodiments, the captured image signal is transmitted in real-time. For instance, a live dynamic video stream may be transmitted instantly (e.g., to one or more social media platforms) based on a view or image detected at the camera assembly. Optionally, multiple image signals (e.g., separate image streams from a first camera assembly and a second camera assembly) may be transmitted simultaneously.

At 920, the method 900 includes presenting an interactive image at image display. The interactive image may be prompted by (e.g., in response to) or based on a received remote image signal 922, recipe signal 924, or control input signal 926. As described above, the remote image signal 922 may include, for example, data regarding a remote dynamic video stream transmitted from a separate user device, secondary appliance, assembly, etc. The recipe signal 924 may include, for example, data regarding a food item, and may be stored locally or received from a separate remote server. The control input signal 926 may include, for example, data regarding gesture signals received from a camera assembly. In some embodiments, 920 includes presenting a remotely captured image, such as a live (e.g., real-time) dynamic video stream, recipe information, or a graphical user interface that a user may engage through one or more recognized gestures.

At 930, the method 900 includes directing activation of the light assembly or ventilation assembly.

In some embodiments, 930 includes directing activation of the light assembly in response to receiving a light visibility signal 932. The light visibility signal 932 may be transmitted to the controller as an isolated user input signal in response to direct user engagement (e.g., selecting light activation at a graphical user interface presented at image monitor). Alternatively, the light visibility signal 932 may be an automatically-generated signal transmitted in response to a detected condition, such as ambient light conditions. In some such embodiments, light visibility signal 932 is transmitted from an ambient light sensor, as described above.

In some embodiments, 930 includes directing activation of the ventilation assembly (e.g., at air handler) in response to receiving a steam visibility signal 934. The steam visibility signal 934 may be transmitted to the controller as an isolated user input signal in response to direct user engagement (e.g., selecting air handler activation at a graphical user interface presented at image monitor). Alternatively, the steam visibility signal 934 may be an automatically-generated signal transmitted in response to a detected condition, such as the temperature or amount of steam at a camera assembly above the cooktop appliance.

At 940, the method 900 includes directing activation of cooktop appliance or a secondary appliance. As described above, one or more heating elements of a cooktop appliance may be activated (e.g., to bring heating elements to a predetermined temperature or heat level). Additionally or alternatively, a component of a secondary appliance (e.g., a dispenser of a refrigerator appliance) may be activated, as described above. In some embodiments, 940 is prompted by (e.g., in response to) or based on a recipe signal 942. Thus, one or more appliances may be automatically controlled according to a provided recipe, advantageously reducing the steps undertaken by a user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking engagement system for a cooktop appliance comprising a cooktop surface defining a vertical direction, a lateral direction, and a transverse direction, the cooking engagement system comprising:
   a first camera assembly positioned above the cooktop surface along the vertical direction, the first camera assembly being directed at the cooktop surface;
   a second camera assembly positioned above the cooktop surface along the vertical direction, the second camera assembly being directed away from the cooktop surface;
   an image monitor positioned above the cooktop surface along the vertical direction, the image monitor being directed away from the cooktop surface;
   a ventilation assembly comprising an air handler and a casing enclosing the air handler, wherein the casing defines an air outlet in fluid communication with the air handler, wherein the air outlet defines an airflow curtain path extending from the casing in front of the image monitor to block steam from contacting the image monitor;

a lighting assembly positioned above the cooktop surface along the vertical direction to emit a light thereto;

an ambient light sensor; and a controller in operable communication with the first camera assembly, the second camera assembly, the air handler, the lighting assembly, the ambient light sensor, and the image monitor, the controller being configured to initiate an interactive cooking operation, the interactive cooking operation comprising receiving a captured image signal from the first camera assembly or the second camera assembly, transmitting the captured image signal to a remote server in response to receiving the captured image signal, receiving a steam visibility signal, directing activation of the air handler to motivate the airflow through the air outlet along the airflow curtain path based on the received steam visibility signal, receiving a light visibility signal from the ambient light sensor, and directing activation of the lighting assembly based on the received light visibility signal.

2. The cooking engagement system of claim 1, wherein the remote server is a social media platform server.

3. The cooking engagement system of claim 1, wherein receiving the captured image signal comprises receiving the captured image signal from the first camera assembly, and wherein the interactive cooking operation further comprises receiving a gesture control signal from the second camera assembly.

4. The cooking engagement system of claim 1, wherein the casing defines an air inlet above the cooktop surface in fluid communication with the air handler.

5. The cooking engagement system of claim 1, wherein the first camera assembly, the second camera assembly, and the image monitor are mounted to the casing.

6. The cooking engagement system of claim 1, wherein the interactive cooking operation further comprises receiving a remote signal corresponding to a remotely captured image from a secondary appliance spaced apart from the cooktop appliance, and presenting the remotely captured image at the image monitor in response to receiving the remote signal.

7. The cooking engagement system of claim 1, wherein the interactive cooking operation further comprises reading a recipe signal, and directing activation of a heating element of the cooktop appliance based on the read recipe signal.

8. The cooking engagement system of claim 1, wherein the interactive cooking operation further comprises reading a recipe signal, and directing activation of a secondary appliance based on the read recipe signal, the secondary appliance being spaced apart from the cooktop appliance.

9. A cooking engagement system for a cooktop appliance comprising a cooktop surface defining a vertical direction, a lateral direction, and a transverse direction, the cooking engagement system comprising:

a ventilation assembly comprising a casing and an air handler in fluid communication with the casing to motivate an airflow therethrough, the casing being spaced apart from the cooktop surface by an open region defined along the vertical direction, the casing defining an air outlet in fluid communication with the air handler, wherein the air outlet defines an airflow curtain path extending from the casing to block steam;

a camera assembly mounted to the casing above the cooktop appliance, the camera assembly being directed at the cooktop surface through the open region; an image monitor mounted to the casing above the cooktop appliance and rearward from the airflow curtain path to avoid steam blocked by the airflow curtain path, the image monitor being directed away from the cooktop surface;

a lighting assembly mounted to the casing above the cooktop appliance, the lighting assembly comprising a light source directed at the cooktop surface to emit a light through the open region;

an ambient light sensor; and a controller in operable communication with the camera assembly, the air handler, the camera assembly, the lighting assembly, the ambient light sensor, and the image monitor, the controller being configured to initiate an interactive cooking operation, the interactive cooking operation comprising receiving a captured image signal from the camera assembly, transmitting the captured image signal to a remote server in response to receiving the captured image signal, receiving a steam visibility signal, directing activation of the air handler based on the received steam visibility signal, directing activation of the air handler to motivate the airflow through the air outlet along the airflow curtain path based on the received steam visibility signal, receiving a light visibility signal from the ambient light sensor, and directing activation of the lighting assembly based on the received light visibility signal.

10. The cooking engagement system of claim 9, wherein the remote server is a social media platform server.

11. The cooking engagement system of claim 9, wherein the casing defines an air inlet in fluid communication with the open region above the cooktop surface.

12. The cooking engagement system of claim 9, wherein the interactive cooking operation further comprises receiving a remote signal corresponding to a remotely captured image from a secondary appliance spaced apart from the cooktop appliance, and presenting the remotely captured image at the image monitor in response to receiving the remote signal.

13. The cooking engagement system of claim 9, wherein the interactive cooking operation further comprises reading a recipe signal, and directing activation of a heating element of the cooktop appliance based on the read recipe signal.

14. The cooking engagement system of claim 9, wherein the interactive cooking operation further comprises reading a recipe signal, and directing activation of a secondary appliance based on the read recipe signal, the secondary appliance being spaced apart from the cooktop appliance.

* * * * *